UNITED STATES PATENT OFFICE.

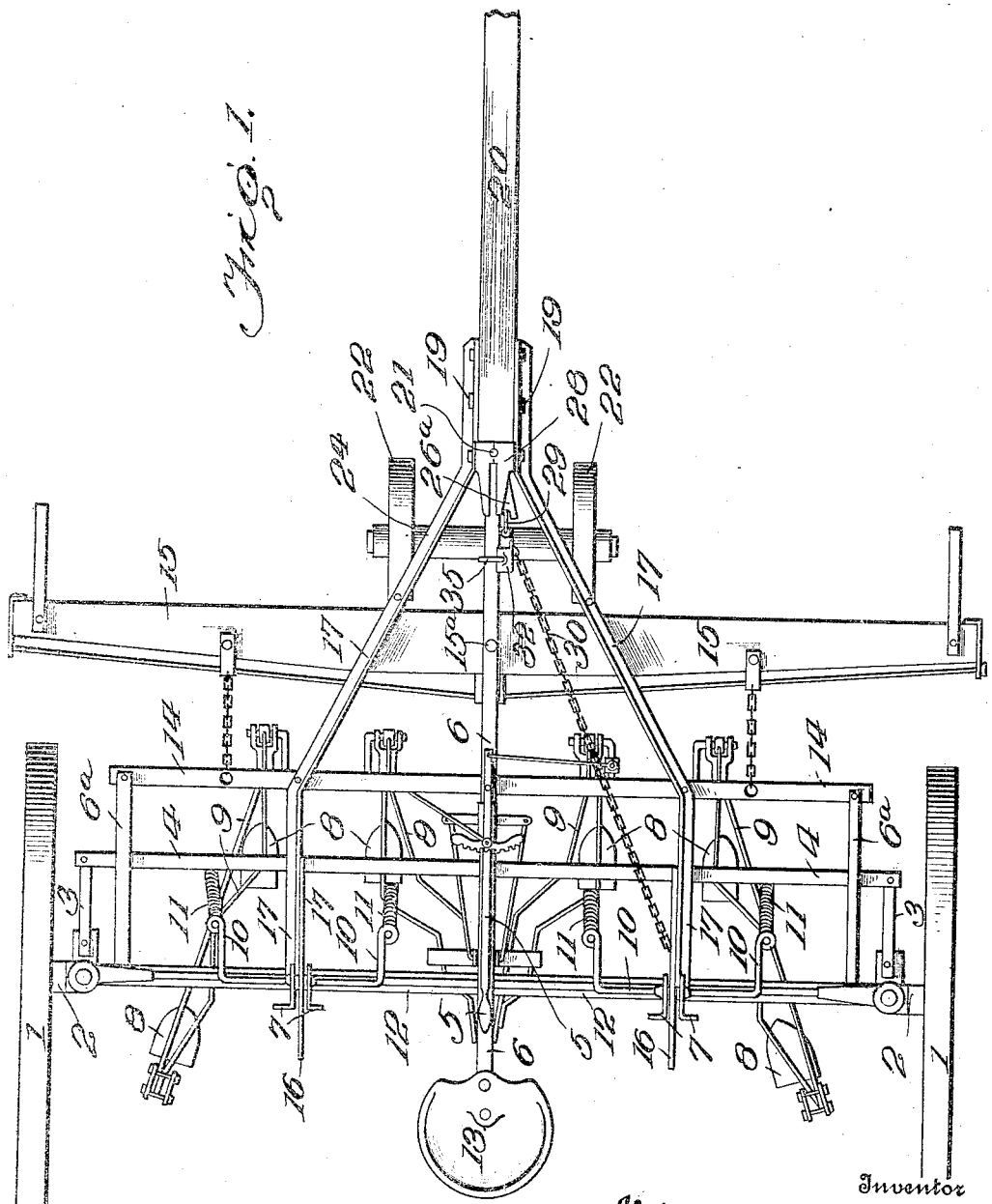

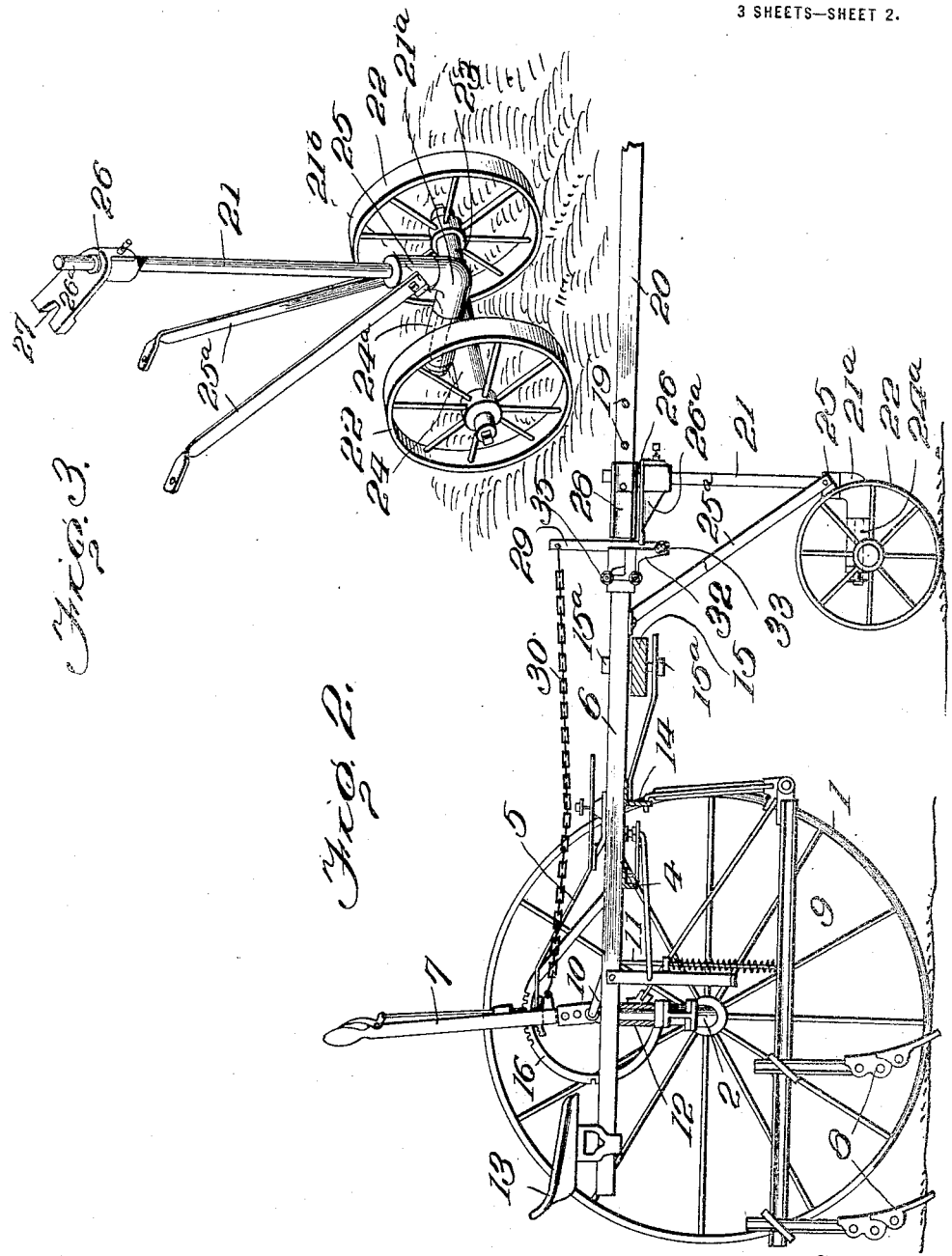

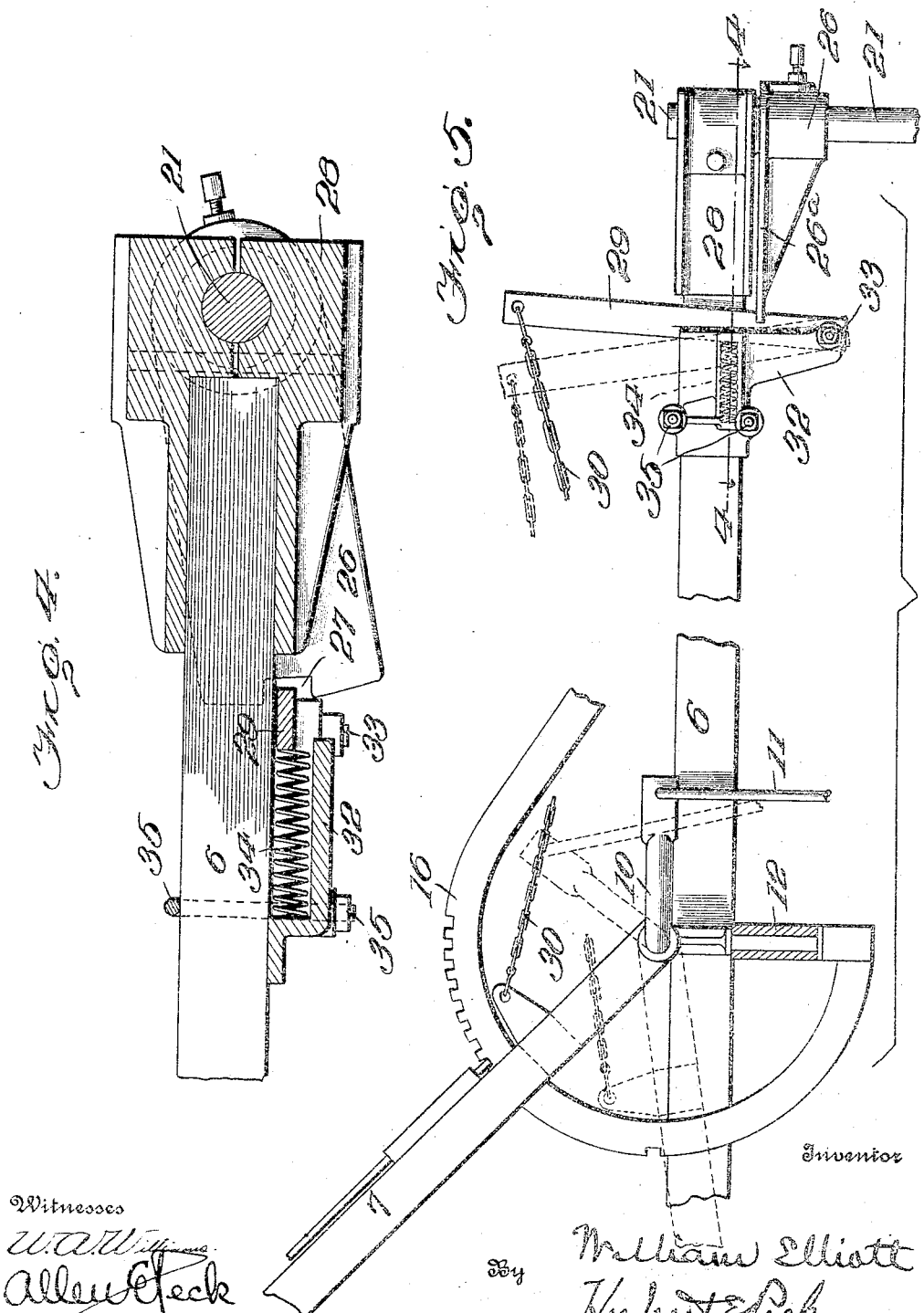

WILLIAM ELLIOTT, OF BEATRICE, NEBRASKA, ASSIGNOR TO DEMPSTER MILL MANUFACTURING COMPANY, OF BEATRICE, NEBRASKA, A CORPORATION OF NEBRASKA.

WHEELED CULTIVATOR AND THE LIKE.

1,246,896.  Specification of Letters Patent.  Patented Nov. 20, 1917.

Application filed November 2, 1914. Serial No. 869,963.

*To all whom it may concern:*

Be it known that I, WILLIAM ELLIOTT, a citizen of the United States, residing at Beatrice, in the county of Gage and State of Nebraska, have invented certain new and useful Improvements in and Relating to Wheeled Cultivators and the like, of which the following is a specification.

This invention relates to certain improvements in cultivators and the like, and the objects and nature of the invention will be readily understood by those skilled in the art in the light of the following explanation of the accompanying drawings illustrating what I now believe to be the preferred embodiment of the invention from among other forms, arrangements and constructions within the spirit and scope thereof.

An object of the invention is to provide a cultivator or the like with an improved front truck particularly designed to support the front end of the machine and thereby relieve the draft animals of neck weight.

A further object of the invention is to provide certain improvements in front supporting trucks for wheeled cultivators and like implements.

A further object of the invention is to provide certain improvements in details of construction and combinations of elements for the production of an improved and highly efficient cultivator implement.

The invention consists in certain novel features in construction and in combinations and arrangements as more fully and particularly set forth and specified hereinafter.

Referring to the accompanying drawings:—

Figure 1, is a plan view of a two row wheeled cultivator provided with my invention.

Fig. 2, is a vertical longitudinal section thereof.

Fig. 3, is a detail perspective.

Fig. 4, is a detail horizontal section on the line 4—4, Fig. 5.

Fig. 5, is a detail side elevation on an enlarged scale and with parts broken away.

In this particular instance, the cultivator embodies an arched axle 12, to the opposite ends of which swingable knuckles or brackets 2, are coupled by vertical spindles or axes, and these brackets carry the horizontal axle stubs or spindles on which the cultivator supporting and steering wheels 1, are mounted. These swingable brackets 2, are provided with suitable manually actuated controlling and steering means, by which the wheels 1, are directed straight ahead or to the right or left. Any suitable foot or hand actuated means can be employed for this purpose, although I show arms 3, projecting forwardly from brackets 2, and these arms 3, are pivotally joined by transverse connecting bar 4, to which the tiller or hand steering lever 5, can be coupled in any suitable manner.

Whatever means are employed for steering the wheels 1, such means are preferably accessible to the driver while located in the seat 13. This driver's seat 13, is preferably carried by the projecting rear end of the center longitudinal beam 6, of the cultivator frame. This frame comprises the main front cross beam 14, parallel with the arched axle and fixedly secured thereto by the center beam 6, by fore and aft bars 6ª, and by the two bars 17. The portions of the bars 17, that traverse and are bolted to the axle 12, and the front beam 14, are preferably parallel and spaced uniform distances from and on opposite sides of the center beam 6. However, said bars 17, extend forwardly from the beam 14, to an advanced point to receive the cultivator tongue 20. The bars 17, converge forwardly from the beam 14, and at their front ends fit the opposite edges of and are bolted to a head or connecting block or casting 28. The center longitudinal beam or bar 6, extends forwardly from the beam 14, and is also fixed to or in said head block 28. In the present instance, the front end of beam 6, extends centrally into said block and is rigid therewith, and the front ends of the two bars 17, are rigidly connected together and to beam 6, by said block to form an exceedingly strong and rigid structure. The parallel front ends of the bars 17, preferably project forwardly beyond the head 28 to receive the rear end of the tongue 20, which can be coupled thereto by a bolt 19, extending through the tongue and bars.

The draft can be applied to the frame in any suitable manner as by double tree 15, mounted on the vertical center bolt 15ª, depending from center beam 6 of the frame.

In the example illustrated, I show the cultivator provided with vertically swingable plow or cultivator beams 9, carrying any suitable plows or cultivator shovels 8, and the vertical positions of these beams are controlled by vertically swingable hand levers 7, within convenient reach from the driver's seat, and provided with toothed sectors 16, and hand controlled latches whereby the hand levers and cultivator beams can be held in the desired adjustments as will be readily understood by those skilled in the art, as any suitable or well known cultivator beams and their controlling means can be employed, such as rock shafts 10, and yielding connections 11.

In the particular example illustrated, I show a two-row cultivator, wherein two main or hand levers 7, are employed arranged on opposite sides of the driver and each controlling two cultivator beams.

The rigid main frame of the cultivator projects forwardly to an advanced point, as hereinbefore described, at which advanced point the tongue 20, is pivotally coupled to said main frame. Also, beneath this advanced point of the main frame, I provide a caster wheel to support the front end of the cultivator and the rear end of the tongue.

This caster wheel is preferably of the trailing two wheel type, although all features of my invention are not so limited. In the particular example illustrated, this truck embodies a transverse housing or axle 24, at its ends provided with the ground wheels 22, suitably confined to and mounted to rotate on or independently of said axle. This axle or housing 24, is formed with a journal box or tubular bearing 24ª, located midway between the wheels 22, and at right angles to the length of the axle, and hence parallel with the line of draft. This bearing box 24ª, receives and is suitably confined to and on the spindle or journal 21ᵇ, rigid with and projecting rearwardly from head 21ª, located at the lower end of and fixed to the vertical spindle or shaft 21.

The upper end of this spindle 21, extends loosely through the cultivator frame head block 28, while the lower end of said spindle is mounted in and extends loosely through a fixed bearing sleeve or collar 25, fixed to and held and supported by upwardly and rearwardly diverging braces 25ª, at their upper ends rigidly secured to the bars 17, at points in rear of the head block 28. The lower end of bearing sleeve 25, rests on the caster wheel frame head 21ª, to aid in upholding the front end of the cultivator frame.

The upper portion of the shaft or spindle 21, is provided with a collar 26, adjustably fixed thereto and arranged below the cultivator frame to aid in upholding the same. This collar 26, is so arranged that the cultivator frame head block 28 rests thereon to uphold the front end of the cultivator frame and the rear of the tongue.

The spindle 21, freely rotates in the sleeve 25, and in the cultivator frame head block 28, as the wheels trail to maintain their common axis at right angles to the line of draft, as will be readily understood by those skilled in the art. Furthermore, the axle 24, of the wheeled truck is free to rock vertically on the intermediate spindle 24ª, as the wheels rise and fall in following the inequalities of the ground. I attain peculiar advantages by thus providing a rocking support for the wheels, although I do not wish to limit all features of my invention thereto.

This front truck travels on the ground and upholds the front end of the cultivator and thus relieves the draft animals of so-called neck weight, and is free to swing laterally on its advanced vertical axis independently of the cultivator frame and without laterally disturbing the position thereof, and yet should the front end of the frame be deflected to the right or left the trailing wheeled support will automatically turn and the wheel or wheels thereof will at once assume the same direction.

In the particular example illustrated, I show the collar 26, on the truck spindle 21, formed with a radial wing 26ª, projecting rearwardly under the nose or front end of the forward extension of the cultivator frame. The curved rear free edge of this wing is formed with an elongated locking notch 27, arranged approximately midway the length of said edge, and adapted to receive the relatively narrow portion of an upright latch 29, at its lower end mounted on a transverse axis or fulcrum 33, carried by the depending end of a bracket 32, clipped to the front end portion of frame bar 6, by U-bolt or clip 35. This bracket is formed with a chamber or housing guiding and confining the latch and containing a compression spring 34, engaging the rear edge of the latch, at a point between the ends of the latch and constantly acting on the latch to press the same forwardly into operative relation with respect to the rear end of the wing 26ª.

I show the upwardly projecting free upper end of latch 29, operatively connected by chain 30, or other flexible pull connection, with a main lever 7, of the cultivator and so arranged that when said lever is thrown back to elevate the cultivator beams from operative position with respect to the ground, the latch 29, will be swung back against the tension of its spring and from operative relation with respect to wing 26ª, and its elongated locking notch, and when lever 7, is swung forwardly to throw the cultivator beams into operative relation to the ground, the connection 30, will be slackened, permitting the spring 35, to press the latch 29, forwardly into operative relation to the wing and its locking notch. The latch and the locking notch in the wing are designed to coöperate in limiting the caster wheel action of the front truck when the cultivating implements are in use in cultivating listed corn or the like, but to permit limited rotation of the spindle 21, and swing of the caster wheels, and hence the locking notch 27, exceeds in length the width of the portion of the latch adapted to enter said latch and limit the swing of the front caster wheel truck. On the other hand, when the latch is held back from operative position by the chain 30, the front caster wheel truck is free to swing through its full range of movement without being limited by the latch.

In cultivating listed corn the cultivator must operate within confined limits and must quickly respond to the guiding wheels 1, in following the rows and in keeping the various wheels on the ridges where they belong.

The front caster wheel truck quickly responds to any change in direction of the front extension of the frame, and I have found that where said truck is allowed to freely swing through its full range of movement when listed corn is being cultivated, that said truck has a tendency to swing too far and not recover quickly enough, when the guiding wheels 1, are suddenly turned in one direction and then in the opposite direction in following the rows, and that the wheels are consequently thrown from the ridges that they should follow or caused to crowd over against the corn rows, all of which is objectionable. It is however, exceedingly advantageous that said front truck should perform caster wheel functions under certain restrictions when the cultivator is operating within confined or restricted limits such as mentioned, so that the operator can freely and quickly guide the cultivator to the right and left by guide wheels 1, without cramping or changing the forward course of the front truck and without cramping the movement of the tongue, and yet so that the swing of the truck will be limited against swinging the wheels into the corn rows.

The length of the notch 27, with respect to the width of the latch is such as to permit the necessary play or free movement of the caster wheel truck under such conditions as mentioned above, and to prevent swing of the truck beyond such limits.

It is obvious that various connections might be employed between operating parts of the cultivator and the latch to limit the swing of the wheeled truck when the cultivator shovels are in operative position, and also that such connections can be so arranged as to move the latch from operative position when the cultivator shovels are elevated, and that these connections can be so arranged as to hold the latch from operative position irrespective of the position of the shovels when the cultivator is to be used for cultivating purposes rendering it desirable that the front truck be allowed unlimited swing. For instance, the chain 30, can be readily uncoupled from the lever 7, and applied to some part of the cultivator frame to hold the latch 29 from operative position where the cultivator is to be used for cultivating plants so arranged and worked as to render it desirable that the wheeled truck be allowed full play during the cultivating operation.

It is evident that various changes, modifications, and variations might be resorted to without departing from the spirit and scope of my invention and hence I do not wish to limit myself to the exact disclosures hereof.

What I claim is;—

1. In a wheeled cultivator, in combination, a frame having a central rigid forward extension, a tongue coupled thereto, an evener coupled to said extension, a caster wheel truck coupled to said extension for upholding the same and the rear end of the tongue, vertically movable cultivator beams coupled to said frame and provided with manually controlled mechanism for determining the vertical position thereof, manually controlled steering wheels supporting said frame, said truck being freely swingable on a vertical axis independently of said extension, and mechanism for coöperating with said extension and said truck to limit the free swinging movement of the truck during listed plant cultivation, substantially as and for the purposes described.

2. A wheeled cultivator having vertically movable cultivator beams carrying cultivating implements, in combination with a freely laterally movable caster wheel support for the front end of the cultivator, and automatic means for coöperating with said caster wheel support to limit its free lateral movement with respect to the cultivator during listed plant cultivation.

3. A steering wheel cultivator having vertically movable cultivator beams and manually controlled means for determining the vertical position of said beams, in combination with a front caster wheel truck for upholding the front end of the frame of said cultivator, and stop mechanism between the cultivator frame and said truck for limiting the free independent swing of the truck when the cultivator beams are in lowered cultivating position and for releasing said truck for full free swing when the cultivator beams are elevated.

4. A wheeled cultivator having vertically movable cultivator beams, in combination with a front caster wheel supporting truck, and latch mechanism controlled by the vertical position of said beams for permitting limited free lateral play of the truck when the beams are in lowered cultivating position and for permitting unlimited lateral play of the truck when the beams are elevated from cultivating position, substantially as described.

5. In combination, in a steering wheel cultivator, a frame, vertically movable cultivator beams coupled thereto, means for determining the vertical position of said beams, a caster wheel truck for upholding the front end of said frame and coupled thereto to freely swing on a vertical axis, a spring held latch carried by said frame and adapted to coöperate with said truck to permit restricted swing thereof, and a pull connection controlled by the vertical position of said beams to operate said latch to permit full unlimited swing of said truck, substantially as described.

6. A wheeled cultivator comprising a vertically movable cultivator beam, a lever for raising and lowering the same, a caster wheel truck at and upholding the front end of the cultivator frame and coupled thereto to oscillate freely on a vertical axis, a latch mechanism between the frame and said truck to limit the free oscillation of the truck when cultivating listed plants, and means whereby said lever when swung in one direction will release said latch mechanism from said truck to permit unlimited oscillation of the truck, substantially as described.

7. A wheeled cultivator having rigid forwardly projecting frame bars and a head block secured thereto, a front tongue coupled to the frame bars in advance of the head block, said head block formed with a vertical bearing opening, a bearing sleeve arranged a distance below and alined with said bearing opening and supported in fixed position from said frame bars, in combination with a swingable caster wheel truck having a head on which said sleeve rests and a vertical spindle extending through said sleeve and said opening and provided with a stop on which said head block rests.

8. A wheeled cultivator having a main frame formed with a rigid forward projection, a tongue secured to the front end of said projection, said projection comprising a center longitudinal bar and opposite side forwardly converging bars, a head block between said side bars and to which said side and center bars are fixed, a doubletree arranged in rear of said head block and pivotally connected to and supported by said center bar, said head block having a vertical bearing opening, a bearing sleeve arranged a distance below said block and alined with said opening, hangers from said side bars supporting said sleeve, and a caster wheel truck for supporting the front end of said frame comprising a vertical spindle mounted in said sleeve and in said opening and having stops below said sleeve and said block.

In testimony whereof I affix my signature in presence of two witnesses.

WILLIAM ELLIOTT.

Witnesses:
  R. H. YALE,
  A. F. HEMBE.

Copies of this patent may be obtained for five cents each, by addressing the "Commissioner of Patents, Washington, D. C."